Jan. 16, 1934. J. W. SIMMONS 1,943,746
MEANS FOR DETERMINING THE SYNCHRONISM OF ELECTRICAL SYSTEMS
Filed July 22, 1929 2 Sheets-Sheet 1
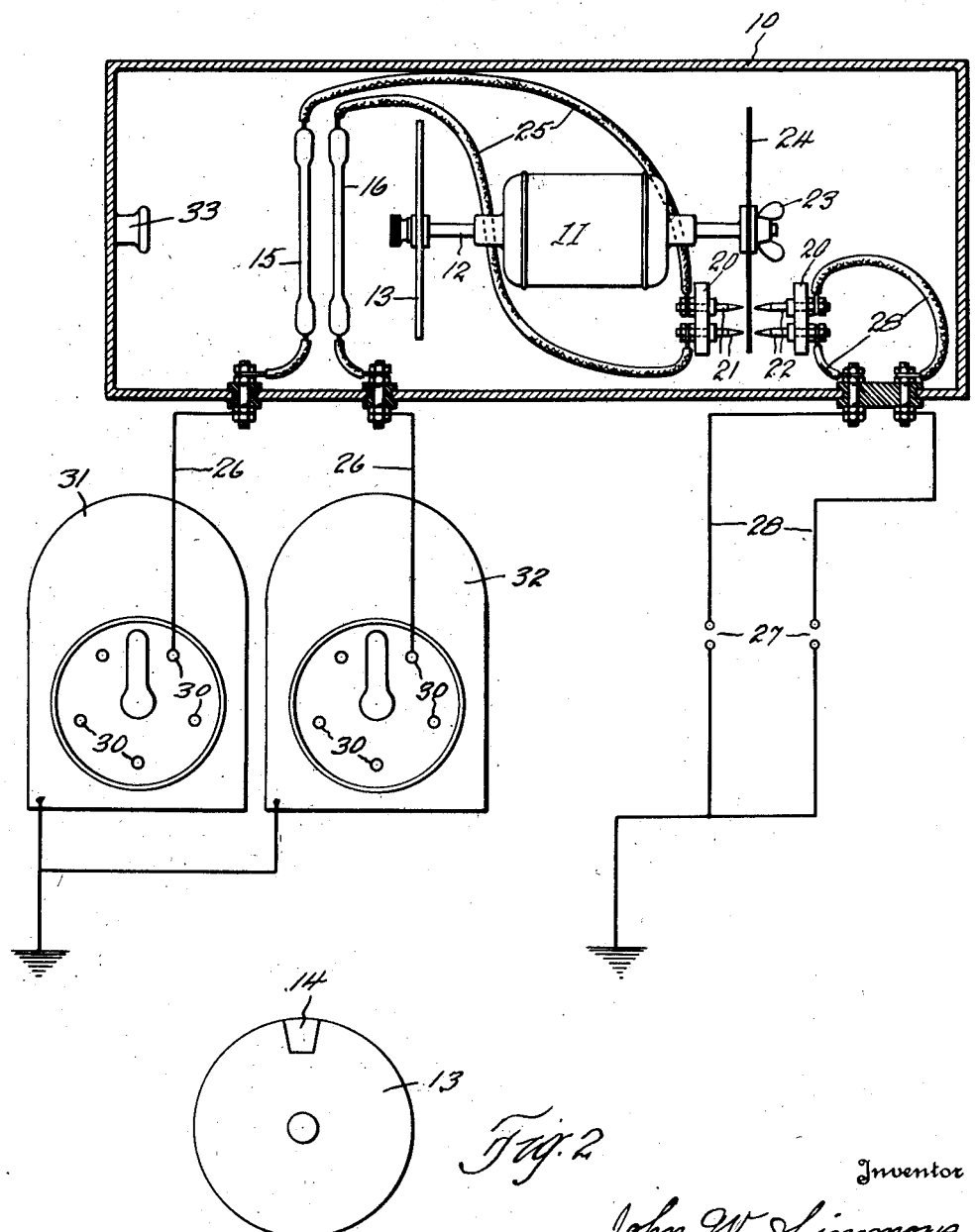

Jan. 16, 1934.    J. W. SIMMONS    1,943,746
MEANS FOR DETERMINING THE SYNCHRONISM OF ELECTRICAL SYSTEMS
Filed July 22, 1929    2 Sheets-Sheet 2

INVENTOR
John W. Simmons
BY F. B. Smith
ATTORNEY

Patented Jan. 16, 1934

1,943,746

UNITED STATES PATENT OFFICE 1,943,746

MEANS FOR DETERMINING THE SYNCHRONISM OF ELECTRICAL SYSTEMS

John W. Simmons, Cleveland, Ohio, assignor to Pioneer Instrument Company, Incorporated, Brooklyn, N. Y., a corporation of New York Application July 22, 1929. Serial No. 380,029

2 Claims. (Cl. 234—1.5)

This invention relates to means for determining the synchronism of electrical systems, and has for its object to provide means which may be connected to a plurality of electrical systems so that the relative time of the interruptions or oscillations of such systems may be directly observed and very slight differences detected.

A further object is to provide means whereby a permanent record may be made which will show exactly the synchronism of such systems.

The device hereinafter described or any form of device embodying my invention may be used in synchronizing the ignition systems of engines when more than one system is used or in determining when generators are brought into exact synchronism so they may be thrown into the line, in connecting in additional generators. A still further example of the use to which the device may be put is in determining the twist in long shafts by connecting to each end some form of electrical timing device, the two being in synchronism. When the load is applied to the shaft, it is possible to determine the twist of the shaft by the amount the electrical systems are thrown out of synchronism.

As a definite example of how my invention may be applied I have illustrated the same as being used in determining the synchronism of ignition systems of twin ignition engines.

The present method of timing the ignition system of motors and the synchronizing of the two systems when twin ignition is used is to set the distributors at a certain designated point, attach the magneto or distributor to its drive shaft and directly observe the opening of the breaker points in each system. This usually requires two men, one at each side who must watch the opening of the breaker points. Because of the irregularity of the surface of the breaker points and other mechanical difficulties, such determination is not accurate in every case and the systems are not in synchronism as they should be for perfect operation of the engine.

Figure 3:
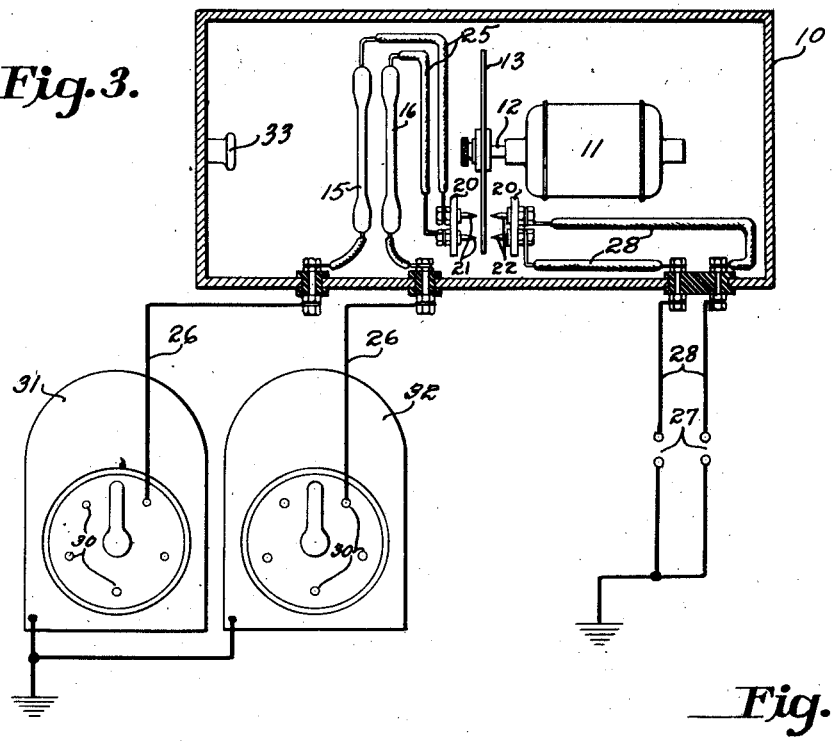
Figure 4:
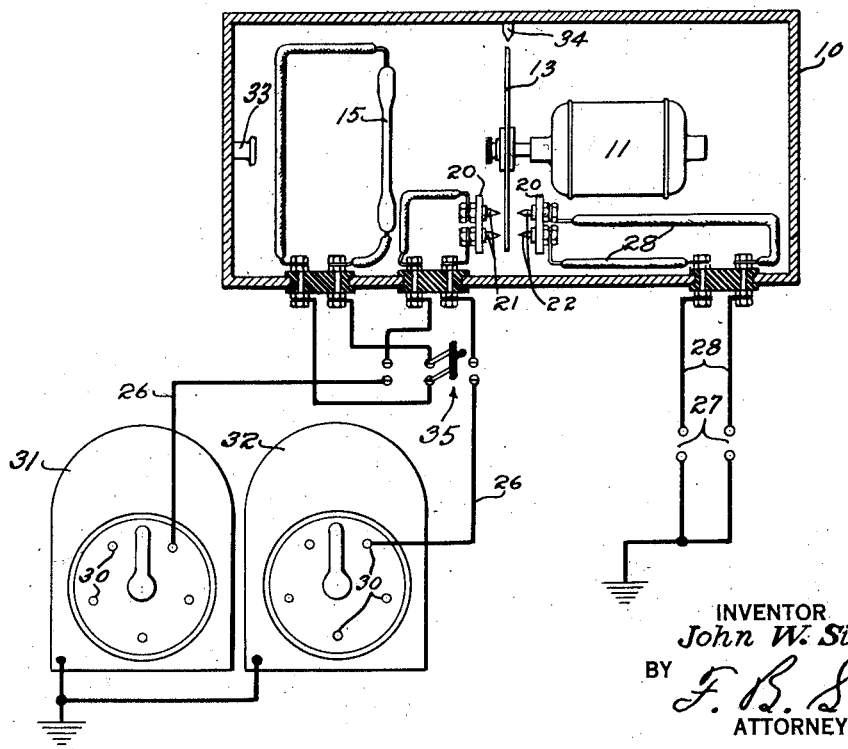

In the accompanying drawings, I have illustrated one form of device embodying the substance of my invention, wherein Fig. 1 is a plan view of one embodiment the synchronism determining device combined with a wiring diagram of the timing device and spark plugs of an engine, the casing of the device being shown in section; Fig. 2 is a front view of the rotating disc showing one form of mark which may be used, Fig. 3 is a plan view of another embodiment of the invention; and Fig. 4 illustrates still another embodiment, wherein only one lamp is used.

In the device illustrated in the drawings, 10 indicates a casing in which is mounted a synchronous motor 11 the speed of which may be varied. Secured to one end of the motor shaft 12 is a disc 13 preferably black in color with a design or mark 14, preferably white in color on its outer surface.

Positioned in front of the disc 13 are two neon tubes 15 and 16 of two different colors, preferably blue and red.

Near the opposite end of the motor are arranged two insulating posts 20 provided with pointed electrodes 21 and 22, the electrodes 21 in one post being arranged opposite the electrodes 22 in the other and spaced apart providing two spark gaps.

The shaft 12 at that end of the motor is provided with a suitable clamping nut 23 whereby a disc 24 of insulating paper may be detachably mounted so as to rotate between the two sets of points 21 and 22, the points or electrodes 21—22 being arranged in a plane passing through a radius of the shaft 12.

One neon tube is connected by means of a suitable wire conductor 25 to one point 21; the second tube is connected to the second point 21 by a similar lead. The opposite terminals of the neon tubes are provided with leads 26 whereby they may be attached to the spark plug connections 30 of the two distributors 31 and 32 of the ignition systems.

The terminals 22 of the spark gaps are provided with leads 28 whereby they may be connected to the two spark plugs 27 in one cylinder of the engine, the timing system of which is to be tested.

When the engine of the airplane, car, etc., on which the distributors 31 and 32 are mounted is running, there is a periodic contact made with the terminals 30 as the distributor rotates and with the device as above described connected in series between the spark plugs of one cylinder of the engine and the respective terminals on the distributing blocks 31 and 32, the neon tubes will flash at each contact, lighting up the front face of the disc 13. At the same time, a spark jumps between the electrodes 21 and 22.

When the motor 11 is running and the discs 13 and 24 rotating at a constant speed, the flashes from the two neon tubes will cause the spot 14 to appear as a design of constant shape.

When the ignition systems are in absolute synchronism the blue and red neon tubes 15—16 flash at the same time and the colors are superimposed on each other giving a clear cut design effect. If the ignition systems are not in synchronism, the neon tubes are lighted at slightly different instances causing an overlapping of the two colors and a spreading of the same.

When this is noted, the mechanic makes the necessary adjustment of the ignition systems until the colors overlap exactly. This indicates that they are in synchronism to a very exact degree. The casing 10 may be provided with a peek hole 33 if desired through which one may see the rotating disc 13 from a definite fixed point relative to the disc.

When properly timed, a disc 24 is placed on the shaft to rotate between the points 21—22 as the sparks jump the gaps they puncture the paper and these punctures will be in the same radial line on the disc. Since the disc 24 is revolving at a relatively high speed any difference in the firing time of the ignition systems will be readily detected. The faster the motor 11 rotates, the greater the puncture distance between the two points on the disc when the ignition systems are not in synchronism.

The disc 24 may be marked with very fine radial lines so that the exact relative position of the punctures may be readily noted.

While I have described the lights 15 and 16 as being different color it is understood that the same colored lights may be used, it being more difficult however to detect the spreading or divergence of the design caused by the intermittent illumination of the rotating mark 14, then when lights of different colors are used.

Since the current used in the ignition systems of motors is of relatively high frequency it is possible to light the tubes 15 and 16 without making a direct connection of both its electrodes in the ignition circuits, so that all the plugs in the engine may be operated even while the timing of the systems is being tested. By connecting one electrode of neon tube to the distributor of the system which is already connected in its usual manner to the spark plug, and by securing about the glass tube part of the neon tube a band of conducting material which is grounded, the tube will flash in the same manner although with less intensity, but at the same time as the spark plug, and the amount of current passing through the plug is not varied to an appreciable extent. By such arrangements, direct connections in an operating circuit are not necessary.

It is also obvious that by the use of a hair line or some form of fixed mark on the lens of the peep hole 33 or by the use of some index, as for example, member 34 in Fig. 4, fixed above the disc 13, only one light need be used which may be alternately connected in one circuit and then the other by suitable means, as for example, switch 35. If the circuits are in synchronism the mark 14 on the disc will appear in the same position relative to the fixed line when either circuit is tested. When out of synchronism the mark 14 will appear at different position relative the fixed mark for each circuit.

While in Fig. 1 I have illustrated two separate discs 13 and 24, one to be illuminated and the other punctured by the sparks at the gaps 21—22, it is, of course, possible to use only one disc made of non-conducting material having fine radial lines on one side and a mark 14 on the opposite side, the lights 15 and 16 being arranged to illuminate the one side of the disc as it rotates between the spark gaps, as illustrated in Figs. 3 and 4.

While I have illustrated several embodiments of my invention it will be apparent to one skilled in the art that various changes may be made and various connections effected to accomplish the result without departing from my invention or the scope of the appended claims.

Having thus described my invention, what I claim is:

1. In a device for determining the synchronism of ignition systems, a light adapted to be energized by said systems, a rotating screen having a mark thereon to be illuminated by said light, and means for determining the relative positions the mark takes when the light is illuminated by either system.

2. In the ignition systems of an engine which include distributors and spark plugs, the combination of a light arranged to be lighted by either system and controlled by the distributor therein, and a rotating screen having a mark thereon to be illuminated by said light, and means providing a mark relative to which the position of the design formed on the screen may be noted.

JOHN W. SIMMONS.